United States Patent
Skvirski

(10) Patent No.: US 8,913,264 B2
(45) Date of Patent: Dec. 16, 2014

(54) METHOD AND SYSTEM FOR STORING AND RETRIEVING DATA

(71) Applicant: Alexei Skvirski, Düsseldorf (DE)

(72) Inventor: Alexei Skvirski, Düsseldorf (DE)

(73) Assignee: Ricoh Company, Ltd., Tokyo (JP)

( * ) Notice: Subject to any disclaimer, the term of this patent is extended or adjusted under 35 U.S.C. 154(b) by 65 days.

(21) Appl. No.: 13/783,676

(22) Filed: Mar. 4, 2013

(65) Prior Publication Data

US 2013/0242326 A1 Sep. 19, 2013

(30) Foreign Application Priority Data

Mar. 13, 2012 (EP) .................................... 12159337

(51) Int. Cl.
*H04N 1/00* (2006.01)
*G06F 17/30* (2006.01)

(52) U.S. Cl.
CPC ...... *H04N 1/00204* (2013.01); *G06F 17/30289* (2013.01)
USPC ........................................ 358/1.13; 358/1.16

(58) Field of Classification Search
USPC ................ 358/1.1, 1.13, 1.16, 400, 404
See application file for complete search history.

(56) References Cited

U.S. PATENT DOCUMENTS

| | | | | |
|---|---|---|---|---|
| 7,583,771 | B2 * | 9/2009 | Zweigle et al. | 375/355 |
| 7,640,539 | B2 * | 12/2009 | Alexander et al. | 717/130 |
| 7,924,884 | B2 * | 4/2011 | Kailash et al. | 370/498 |
| 2009/0150289 | A1 | 6/2009 | Joe et al. | |

FOREIGN PATENT DOCUMENTS

WO WO2008/065638 A2 6/2008

OTHER PUBLICATIONS

The Extended European Search Report dated Jun. 8, 2012.

* cited by examiner

*Primary Examiner* — Thomas D Lee
(74) *Attorney, Agent, or Firm* — IPUSA, PLLC

(57) ABSTRACT

A database management system includes a first data storage structure for storing timestamped counter data entries for each of devices in an unordered manner and such that each counter data entry is assigned a uniquely identifiable storage address; a second data storage structure for storing and mapping between: address data identifying the storage addresses of counter data entries, excluding those which are null or empty, timestamps corresponding to the counter data entries, and device identifiers identifying the devices to which the counter data entries correspond; and data access means for, in response to receiving a request for data in respect of a specified time period and at least one of the devices, using the second data storage structure to identify, for the or each specified device, the storage addresses of the temporally first and last counter data entries falling within the specified time period and not null or empty.

15 Claims, 6 Drawing Sheets

| ADDRESS | PRINTING DEVICE ID | TIME STAMP | COUNTER VALUE |
|---|---|---|---|
| A101 | 1 | 1 | 1 |
| A102 | 1 | 2 | 3 |
| A103 | 1 | 3 | 15 |
| A104 | 1 | 4 | 16 |
| ... | ... | ... | ... |
| A205 | 2 | 1 | n/a |
| A206 | 2 | 2 | n/a |
| A207 | 2 | 3 | 10 |
| A208 | 2 | 4 | 25 |
| ... | ... | ... | ... |
| An01 | n | 1 | 9 |
| An02 | n | 2 | 15 |
| An03 | n | 3 | 25 |
| An04 | n | 4 | 25 |
| ... | ... | ... | ... |

514

| ADDRESS | PRINTING DEVICE ID | TIME STAMP | ADDRESS | HIERARCHICAL ID |
|---|---|---|---|---|
| B101 | 1 | 1 | A101 | 1 |
| B102 | 1 | 2 | A102 | 1 |
| B103 | 1 | 3 | A103 | 1 |
| B104 | 1 | 4 | A104 | 1 |
| ... | ... | ... | ... | ... |
| B201 | 2 | 3 | A207 | 2 |
| B202 | 2 | 4 | A208 | 1 |
| ... | ... | ... | ... | ... |
| Bm01 | n | 1 | An01 | 2 |
| Bm02 | n | 2 | An02 | 2 |
| Bm03 | n | 3 | An03 | 2 |
| Bm04 | n | 4 | An04 | 2 |
| ... | ... | ... | ... | ... |

METHOD AND SYSTEM FOR STORING AND RETRIEVING DATA

CROSS-REFERENCE TO RELATED APPLICATION

The present application is based upon and claims the benefit of priority of European Patent Application No. 12159337.0, filed on Mar. 13, 2012, the entire contents of which are incorporated herein by reference.

BACKGROUND OF THE INVENTION

1. Field of the Invention

Embodiments described herein generally relate to storing and retrieving data, particularly but not exclusively, data about networked office equipment.

2. Description of the Related Art

Many modern day electronic devices, such as printers, copiers, scanners, and multi-function devices (MFDs) have the ability to generate device usage and other data. Often, such devices are provided with network connections so that the data can be periodically transmitted to a central database for subsequent analysis. As the number of devices, as well as the number of device parameters to which the data pertains, can be large, the amount of data collected over time can be vast.

Although many conventional systems in widespread use today, such as relational database management systems, have the ability to store vast amounts of data collected over time (i.e. time-varying data), the rules governing transactions in relational databases offer very little built-in support to adequately analyze it. In other words, queries for historical data are difficult in a relational database. To resolve this issue, separate analytical structures are often used. Thus, the data can be stored in a relational database, whereas the analysis is performed by a tightly coupled analytical counterpart. However, existing implementations, particularly those for enterprise printing systems, make use of vendor-specific and/or complex queries that consume computer resources to a degree that significantly reduces system performance.

It is therefore desirable to provide improved systems and methods for management and analysis of data.

SUMMARY OF THE INVENTION

One aspect of the invention provides a database management system, comprising a first data storage structure for storing timestamped counter data entries for each of a plurality of devices in an unordered manner and such that each counter data entry is assigned a uniquely identifiable storage address; a second data storage structure for storing and mapping between: address data that identifies the storage addresses of counter data entries, excluding those counter data entries which are null or empty, timestamps corresponding to said counter data entries, and device identifiers that identify the devices to which said counter data entries correspond; and data accessing means for, in response to receiving a request for data in respect of a specified time period and at least one of said plurality of devices, using the second data storage structure to identify, for the or each specified device, the storage addresses of the temporally first and last counter data entries that fall within the specified time period and that are not null or empty.

One aspect of the invention provides a method of accessing data in a database management system, the method comprising in a first data storage structure, storing timestamped counter data entries for each of a plurality of devices in an unordered manner and such that each counter data entry is assigned a uniquely identifiable storage address; in a second data storage structure, storing and mapping between: address data that identifies the storage addresses of counter data entries, excluding those counter data entries which are null or empty, timestamps corresponding to said counter data entries, and device identifiers that identify the devices to which said counter data entries correspond; and in response to receiving a request for data in respect of a specified time period and at least one of said plurality of devices, using the second data storage structure to identify, for the or each specified device, the storage addresses of the temporally first and last counter data entries that fall within the specified time period and that are not null or empty.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Further aspects, features and advantages of the invention will become apparent to the reader of the following description of specific embodiments of the invention, provided by way of example only, with reference to the accompanying drawings, in which:

FIG. 5 schematically shows data storage structures, according to an embodiment;

DETAILED DESCRIPTION OF THE PREFERRED EMBODIMENTS

Printing devices may maintain a set of internal, digitally controlled "gauges", also known as "counters". These counters may reflect, for example, the amount of copies being printed, and are subject of manufacture's specifications. Polling may be carried out periodically to obtain the counter data, normally by utilizing some sort of scheduling mechanism.

Of particular interest here are so-called "absolute counters". This means that their values reflect a total count value at a specific point in time. Thus, in order to obtain the counter value for a printing device for a given time period (referred to herein as a reporting time period), one can subtract the counter value corresponding to the beginning of that time period from the counter value corresponding to the end of that time period.

However, it is typically not possible to obtain counter data for every point in time and every device, over an arbitrary reporting time period of interest. For example, a printing device may simply not be physically available at a particular counter polling time, may be in an offline mode, may have a network communications problem, or the like. This results in "gaps" (data discontinuity) in the device counter data.

Generally speaking, there are three types of printing device data discontinuity to be found: 1) those occurring at the beginning of a reporting time period; 2) those occurring at the end of a reporting time period; and 3) those occurring at both the beginning and the end of a reporting time period. A special case exists where there is no counter data for the entire reporting time period.

FIGS. 1A to 1D schematically show the three types of data discontinuity mentioned above, for a reporting time period 102 for a single printing device. In this particular example, the reporting time period corresponds to a sequence of fourteen days, each day being represented as an ordinal integer. It will be appreciated that, in practice, other reporting time periods are possible, that time intervals other than days may be used, and that timestamps may be used instead of ordinal integers. In these figures, hashed slots represent days for which data is stored, while empty slots represent days for which no data is available. Thus, in FIG. 1A, there are no data gaps for the reporting time period 102; in FIG. 1B, a data gap 104 exists at the beginning of the reporting time period 102; in FIG. 1C, a data gap 106 exists at the end of the reporting time period 102; and in FIG. 1D, data gaps 104, 106 exist at the beginning and the end of the reporting time period 102.

Figure 1A:
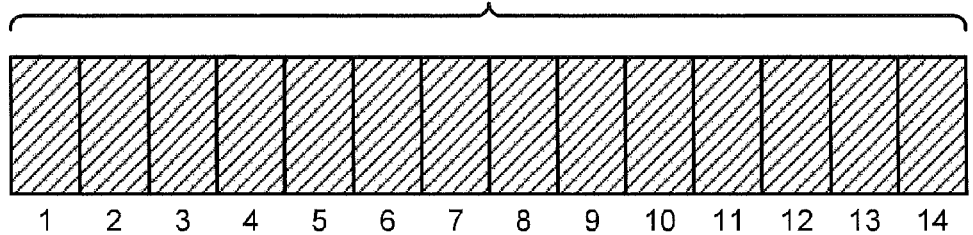
FIGS. 1A to 1D schematically shows different types of data discontinuity.
Figure 1B:
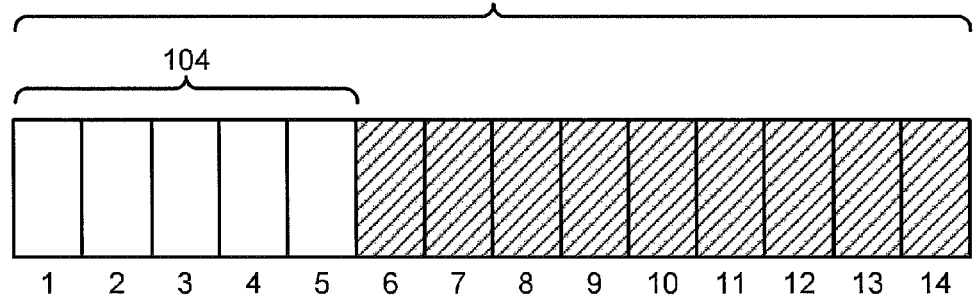
Figure 1C:
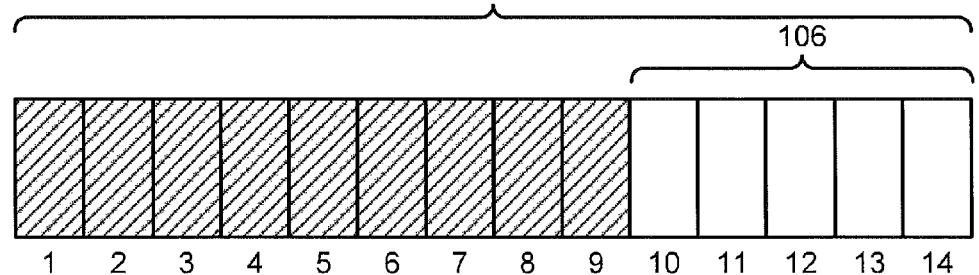
Figure 1D:
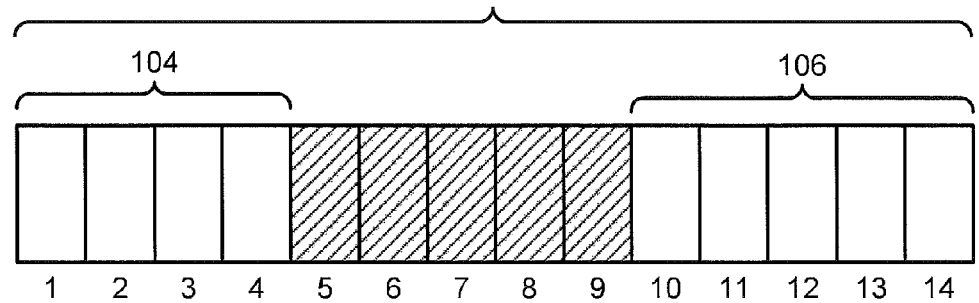
Figure 2A:
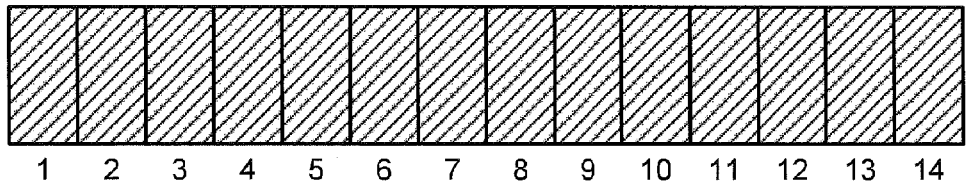
FIGS. 2A to 2D schematically shows searching processes for the different types of data discontinuity shown in FIGS. 1A to 1D.
Figure 2B:
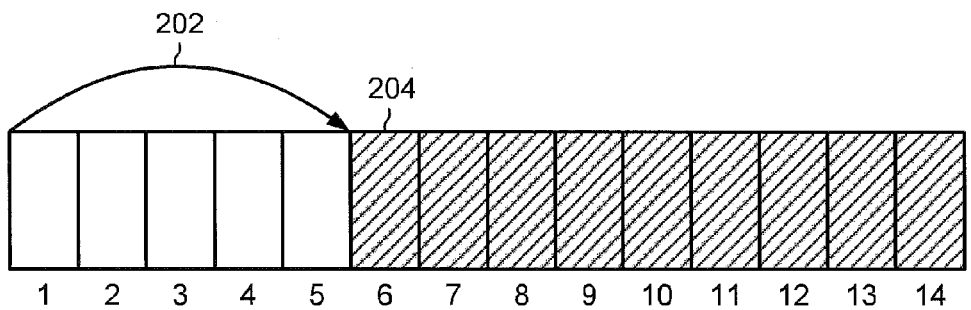
Figure 2C:
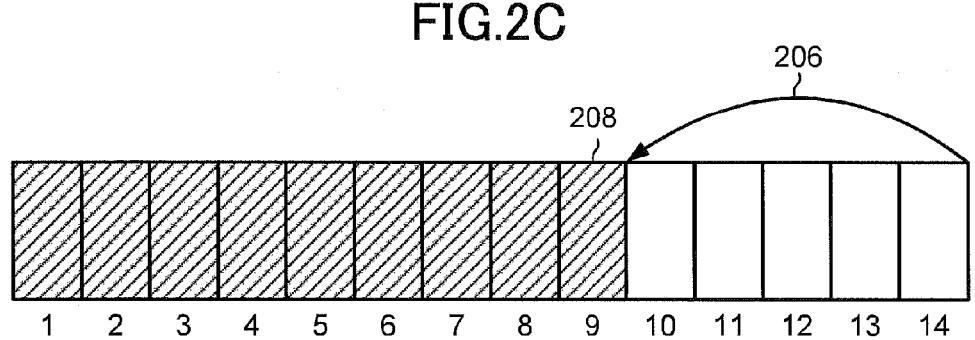
Figure 2D:
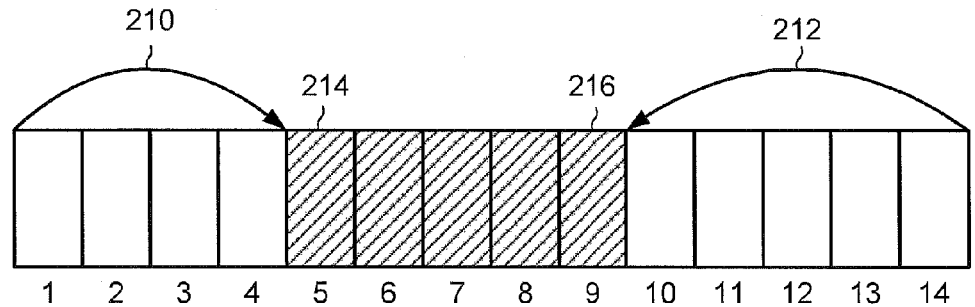

As noted earlier, in order to determine the absolute counter value for a printing device for a given reporting time period, one can determine the counter data values corresponding to the earliest and latest timestamps, and then subtract one from the other. Typically, this requires a linear search operation to skip any missing data. That is because many data structures, such as relational tables (also known as heap tables), store data in an unordered manner. This means the data is not stored in any particular order (i.e. not organized by "datetime" for example). It will also be appreciated that the data represented by the figures may constitute only a fraction of the available data. A search for the counter data values corresponding to the earliest and latest timestamps within a reporting time interval may therefore end up reading all of the counter data for that reporting time interval before it finds these counter data values. Thus, as shown in FIGS. 2A to 2D, while no search to skip missing data is required in the event that data exists for the entire reporting time period, where counter data is missing at the beginning of the reporting time period (FIG. 2B), a search 202 must be performed to identify the counter data value 204 corresponding to the earliest timestamp within the reporting time period. Similarly, where data is missing at the end of the reporting time period, as shown in FIG. 2C, a search 206 must be performed to identify the counter data value 208 corresponding to the latest timestamp within the reporting time period. In the case where data is missing at both the beginning and the end of the reporting time period, two searches 210, 212, need to be performed to identify the counter data values 214, 216 corresponding to the earliest and latest timestamp, respectively, within the reporting time period In practice, an end-user (e.g. an organization) is seldom interested in only a single printing device. Within a relatively large printing infrastructure, one may consider N printing devices being used in parallel, where N can cover hundreds, thousands and even several thousands of printing devices. Data discontinuities of one or more of the aforementioned type might be observed simultaneously for a significant proportion of the N printing devices. However, the sheer volume of data that may be accumulated presents challenges for efficiently retrieving data. In particular, it is difficult, if not impossible, to make any valuable prediction about data gap distributions. Employing search operations in the case of N printing devices may require N search runs and thus require N search times, and is computationally time-consuming.

Figure 3:
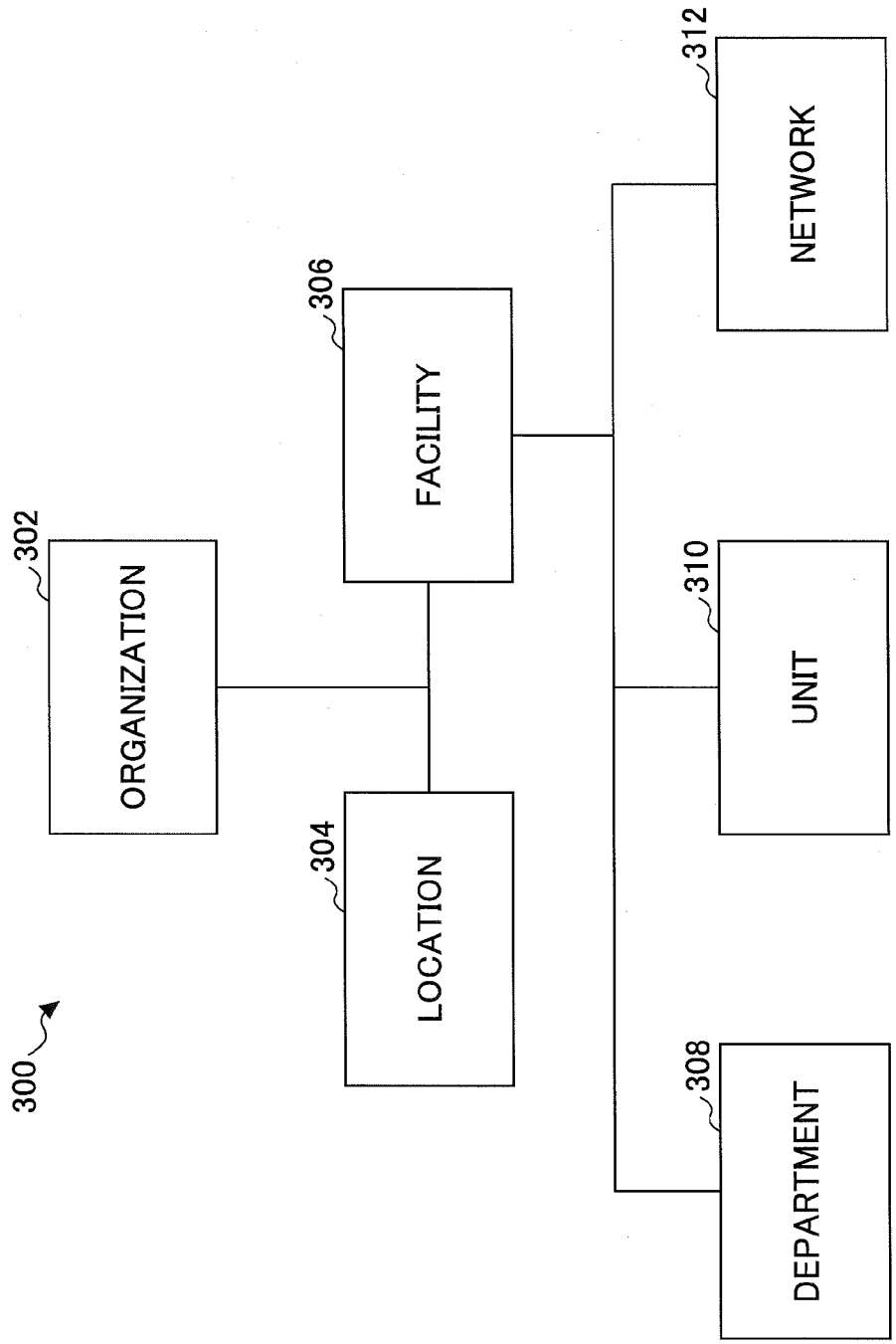
FIG. 3 schematically shows an organizational hierarchy.

Furthermore, the end-user may be interested in a subset of the N printing devices, for example those at a specific physical (or logical) location within the organization. As a general rule, every installed printing device can be seen as a part of an already existing infrastructure. Thus, end-users often have their own organizational infrastructure, reflecting their internal hierarchy. FIG. 3 is a schematic diagram of an organization hierarchy represented as a tree-like structure 300 with the top-most (or root) node 302 representing the entire organization and the branches representing, in this example, different locations 304, facilities 306, departments 308, units 310 and networks 312. Thus, in one embodiment, the hierarchy is such that the location corresponding to root the root node 302 includes all other locations within the hierarchy 300. Similarly, a node (such as node 302) that is connected to one or more nodes appearing lower in the hierarchy (such as nodes 308, 310 and 312) contains all of those lower nodes. Accordingly, there may be overlap between the different branches, i.e. a node may be part of two or more branches. Typically, database management systems do not allow an end-user to distinguish between different locations in the customer's infrastructure at any specified moment of time.

Figure 4:
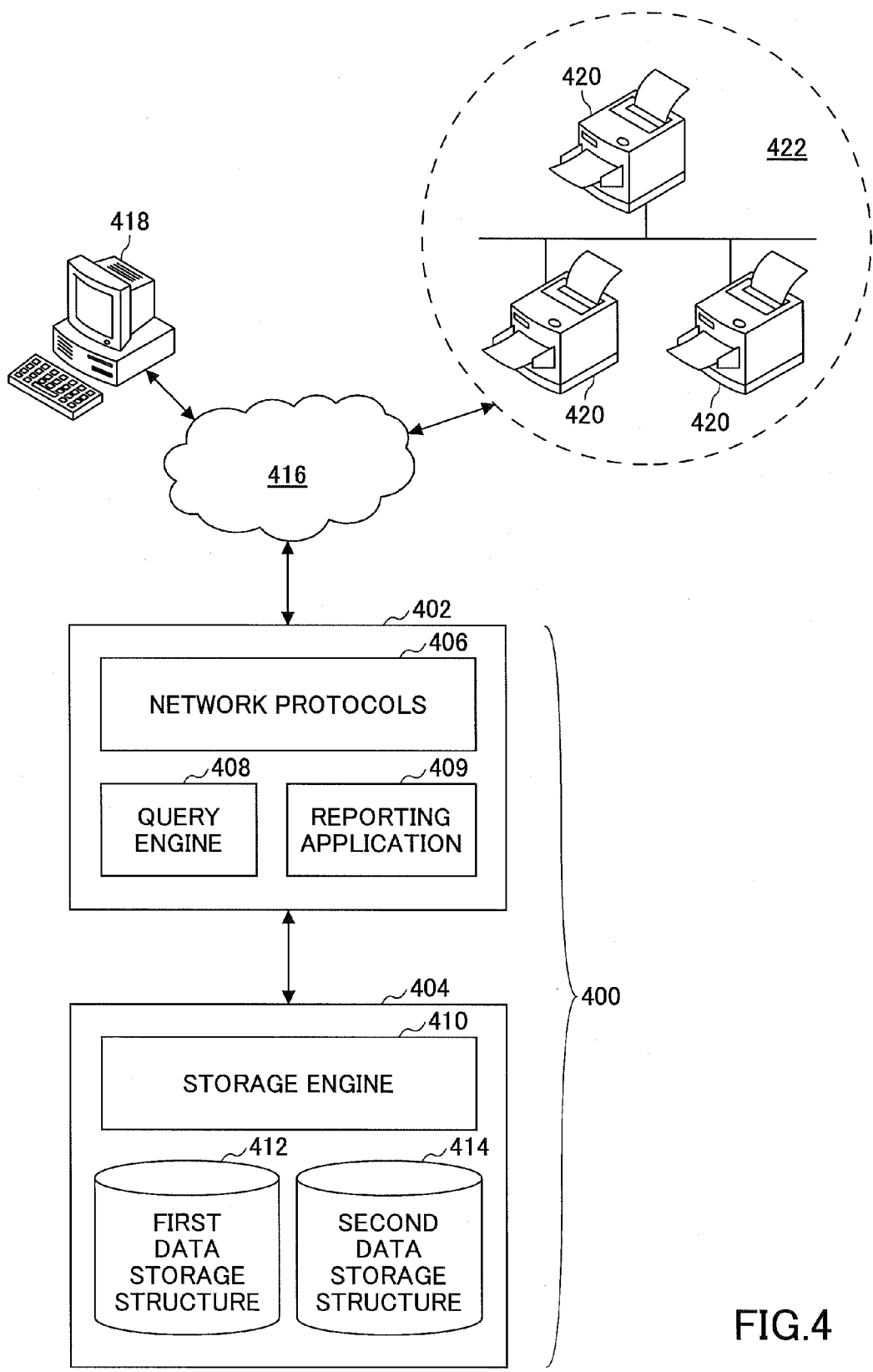
FIG. 4 schematically shows a database management system, according to an embodiment.

FIG. 4 schematically shows a database management system 400, which, broadly speaking, functions to collect and store data obtained from printing devices 420 of an infrastructure 422, and to provide a means of accessing the stored data by the end-user 418. The database management system 400 comprises a database server 402 and a data storage system 404, though these do not have to be separate sub-systems as shown. Furthermore, any separation need not be "physical", i.e. they may be integrated.

The database server 402 comprises network protocols 406, a query engine 408 and a reporting application 409. The network protocols 406 provide the functions of connection handling, authentication, security, and so forth over network 416. The network 416 can be a wide area network such as the Internet. The query engine 408 is responsible for query optimization and execution. Its components may comprise a parser, a query optimizer, and a query executor (not shown). In brief, the parser primarily functions to check query syntax. The query optimizer determines how to retrieve the data as quickly and efficiently as possible. It may, for example, choose from among several different ways to execute the query, and then creates a plan of execution that can be understood by the query executor. The query executor then interprets the execution plan and, based on the information it has received, makes requests of the other components of the system, such as the storage engine 410 of the data storage system 404, to retrieve the data. Once the data is retrieved, it is passed to the reporting application 409 for presentation to the end-user.

The data storage system 404 comprises a storage engine 410, which is responsible for the efficient storage and access of data to and from the first and second data storage structures 412, 414. The database server 402 communicates with the storage engine 410 through a storage engine application programming interface (API) (not shown).

In embodiments, the database management system 400 may periodically poll the printing devices 420. Thus, there may also be a polling application for managing the polling process. However, this is not shown for reasons of clarity.

In order to generate a report, the end-user 418 formulates and submits a query to database server 402. In embodiments, the database management system 400 uses the Structured Query Language (SQL). In SQL, queries refer to a widely available set of SQL commands called clauses. Each clause (command) performs some sort of function against the database. The query specifies some criteria by which the database server should select data from among all of the data contained in the database system. In one embodiment, the query comprises a SQL SELECT clause. The database server receives and executes the query. In executing the query, the database server forms a result set and sends the result set to the reporting application for 409 for presentation to the end-user. The result set is a selected subset of all of the data in the database system (This is described in more detail below). The result set consists only of the data that satisfied the criteria specified in the query.

The database management system may be implemented as a data processing system having at least one processor. In one embodiment, the at least one processor is a conventional processing device, such as a general-purpose microprocessor. The data processing system also includes a memory, which includes program instructions or functional units that implement the aforementioned features, such as the query engine 408 and the storage engine 410.

FIG. 5 schematically shows first and second data storage structures 412, 414 according to an embodiment.

In one embodiment, first (or primary) data storage structure 412 is a relational data structure. This is a logical data structure in which data is stored in relation tables. As shown in FIG. 5, table 512 stores data about devices, events occurring at those devices, and the time at which those events occurred. These are defined by the columns of the table 512, named Printing Device ID, Counter Value, and Timestamp, respectively. Thus, in one embodiment, each row is a record comprising three fields, storing a device identifier, a counter data entry, and a timestamp. These are generally not temporally ordered as shown in table 512. Timestamps are indicative of points in time at which counter data was, or was expected to be, obtained (received by database management system 400 or sampled by the printing devices 420). It will be appreciated that the timestamps are shown in the FIG. 5 as ordinal values (1, 2, 3, . . . , N) for the sake of clarity only. Where no counter data is available, the counter data entry may be a "null" or simply left empty. Since a null is not a member of any data domain, it is, strictly speaking, not a "value" but rather a marker (or placeholder) indicating the absence of value.

In one embodiment, the counter data values are absolute counter values, meaning that each represents the total number of occurrences of events being counted, for example number of pages printed. The counter data therefore comprises numerical data values measured with respect to or bound by time. It will be appreciated that the occurrences of events being counted may not necessarily change over time, as shown by the counter data stored at address "An03" and "An04". However, each still has an associated timestamp. In one embodiment, the counter data is collected repeatedly over time at fixed periods. The frequency, or "granularity", of the time periods can be seconds, minutes, hours, days, weeks, months, or years. In one embodiment, the frequency is n-times a day (either at regular or irregular time intervals), for example n ranging from 2 to 8 depending on networking infrastructure. This is because polling may often impose substantial loads on networking bandwidth, even causing temporary network "storms" or "collapses".

In one embodiment, second (or auxiliary) data storage structure 414 is a multidimensional data storage structure 514 (in mathematical terms, a hypercube). For convenience, however, it is shown as a two-dimensional table. In one embodiment, the data storage structure 514 comprises an index object, which is a physical data structure that allows direct (vs. sequential) access to data. The data stored in the data storage structure 514 is based on the data stored in the table 512. In embodiments, data storage structure 514 stores and maps between printing device identifiers, time stamps, and address data that identifies the storage location of the corresponding counter data where it is available. In one embodiment, data storage structure 514 also stores a hierarchical ID corresponding to the location of the device within the end-users organizational infrastructure, as described with reference to FIG. 3. For example, a hierarchical ID of "1" may correspond to the entire organization. In the embodiment shown with reference to FIG. 5, data storage structure 514 stores one hierarchical ID per entry.

Figure 6:
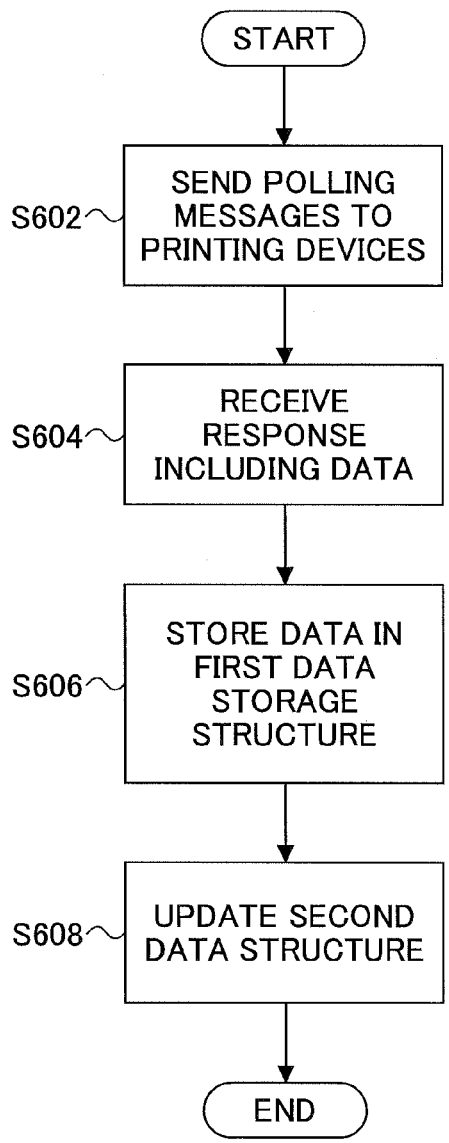
FIG. 6 is a flow chart of a data storage process, according to an embodiment.
Figure 7:
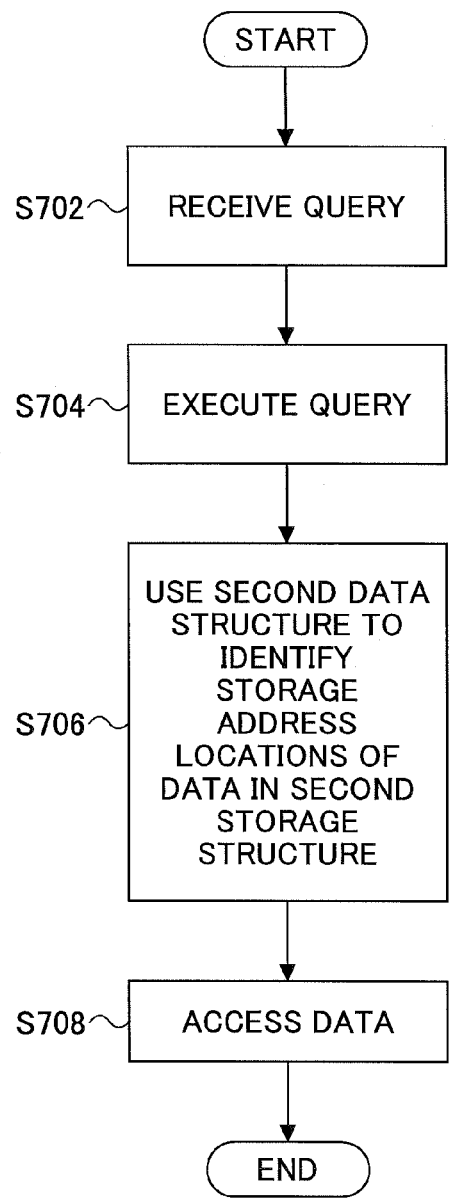
FIG. 7 is a flow chart of a data access process, according to an embodiment.

The use of the aforementioned data storage structures will now be described with reference to FIGS. 6 and 7.

At step S602 a polling application, which may be separate from, but communicatively connected to, the database management system 400, sends polling messages to printing devices 420. In response, those printing devices that are "active" send a response message that includes a counter data value (S604). The polling application then maps the received response messages to the device identifiers. The message may also include a location identifier, which may ultimately be determined based on input from a user. At step S606, the data is stored in the first data storage structure (e.g. table 512). At step S608, the second data storage structure (e.g. table 514) is updated.

When database server 402 then receives a request for data (in the form of an SQL query for example) from the end-user 418 via network 416 and network protocols 406 (step S702), the SQL query is passed to the query engine 408, where it is parsed, optimized and executed (step S704). The requested data is retrieved by the storage engine 410 of the data storage system 404 and the results passed back to the reporting application 409, where it is prepared for presentation to the end-user 418.

As noted earlier, relational data structures have no "understanding" that the stored data is part of time-varying data collection. This means that a query specifying a particular time point for which there is no counter data value will return a null because no counter data value exists for that particular time point. Furthermore, in the case of data discontinuity, the database management system 400 has to first find the counter data corresponding to the earliest and/or latest timestamp for the reporting time period. This requires N searches in the case of N printing devices. When making use of the second data storage structure, such a search becomes obsolete because, firstly, the database management system 'knows' whether or not a counter data value exists for a given point in time, and, secondly, can directly access it in the first data storage structure using the address information.

Thus, with reference to FIG. 5, for a reporting time period covering the time stamps "1" through "4" for example, no counter data values exist in respect of printing device 2 and time stamps "1" and "2". Accordingly, table 514 does not store address data in respect of these time stamps for this device. Instead, address data is only stored in respect of time stamps "3" and "4", for which counter data values do exist. This means that for this reporting time period the database management system 400 immediately proceeds to time stamp "3", finds the address data value "A207", and accesses the counter data value at that address (the value "10").

In other words, by storing and mapping between address data for which counter data values exist and timestamps, the second data storage structure provides an indication of where the storage engine should "go".

Although in foregoing embodiments the first data storage structure in which the counter data for each device is stored in a column, in other embodiments the counter data for each device can be stored as a dedicated table, as a set of rows in a shared table, or as a single row in a shared table.

Although in foregoing embodiments the second data storage structure is an index object, in other embodiments it is a "view" or a "materialized view". A view can be thought of as the parsed binary language implementation of a query that, when executed, extracts or derives data from a data storage structure that it references, in this case first data storage structure. As it is stored, the view (i.e. query) can be repeatedly used without having to re-write the same query many times. Furthermore, as the view is based on the first data storage structure, it does not take up any storage other than storage for the definition of the view (i.e. the query) in a data dictionary. A materialized view, on the other hand, is a physical data structure defined by a result set produced when a query is executed. In other words, a materialized view comprises a pre-computed query result that may be stored in a persistent manner for quick access later. This may be implemented in the form of the second data storage structure described above with additional record logging mechanism, i.e. also storing the counter data. The materialized view is synchronized with the source of its data structure, i.e. the first data structure. If it is not, then the materialized view is rendered "stale" and the database query execution plan executor will not make use of it.

Although in foregoing embodiments, the database system is implemented in the context of networked office devices such as printers, copiers, and facsimile devices (or devices providing a combination thereof), it will be appreciated that the database system is relevant to other kinds of devices. Broadly speaking, these kinds of devices provide, or rather posses, different kinds of information in a machine readable digital format, as well as digitally-aware devices, which represent the kinds of devices that possess information content that can be digitized. For example, these sorts of devices can contain, for example optical, mechanical and other data which can be measured, evaluated and converted into a machine-readable electronic format.

Although in foregoing embodiments, the second data storage structure stores one hierarchical ID per entry, in other embodiments the second data storage structure 514 may store a plurality of hierarchical IDs for each entry. An additional structure providing "drill down" functionality may be provided, for example mapping the Hierarchy IDs to the sort of a "tree" structure corresponding to the hierarchy.

Although in foregoing embodiments the data arrives from devices on a regular basis, the data may also arrive at an irregular basis, or a combination of both. Whereas regular data arrives at predictable predefined periods, irregular data arrives at unspecified points in time or timestamps cannot be characterized by a repeating pattern.

Although in foregoing embodiments the timestamps are associated with time points (i.e. a specific instant in time, based on the precision of the data type), in other embodiments the timestamp may be associated with time periods.

Although in foregoing embodiments SQL queries are used to specify information to be retrieved, in other embodiments the queries can be formulated in other query languages.

It will be understood that a storage location address may not describe a physical location; instead, it used as a means to request information from a controller. The controller converts the request from a logical to a physical address that is able to retrieve the data from an actual physical location on the storage device.

In the foregoing detailed description of embodiments, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments can be in the form of a hardware implementation, a software implementation, or a mixture of both. Thus any of the "means", "components" and "parts" defined herein can be implemented as code modules in different combination in a computer.

Embodiments encompass a computer program provided as a computer program product on a storage medium. The computer program can be stored on a storage medium such as a solid state memory, an optical disc, a magnetic disc, or tape device. The computer program product can be involved in the implementation of an embodiment, either as a complete set of computer executable instructions capable of configuring, on its own, the performance of one or more of the embodiments, or as a set of instructions engaging pre-existing operable software components on a computer, to cause the configuration of the computer in the desired manner. The computer program product may be directly executable, or may require local processing, such as decoding, decompression, or compilation, before it is in an executable condition.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A database management system, comprising:
    a first data storage structure for storing timestamped counter data entries for each of a plurality of devices in an unordered manner and such that each counter data entry is assigned a uniquely identifiable storage address;
    a second data storage structure for storing and mapping between:
        address data that identifies the storage addresses of counter data entries, excluding those counter data entries which are null or empty,
        timestamps corresponding to said counter data entries, and
        device identifiers that identify the devices to which said counter data entries correspond; and
    data access means for, in response to receiving a request for data that specifies a time period and at least one of said plurality of devices, using the second data storage structure to identify, for the or each specified device, the storage addresses of the temporally first and last counter data entries that fall within the specified time period and that are not null or empty.

2. The database management system according to claim 1, wherein the data storage structure is for storing and mapping between: said address data, said timestamps, said device identifiers, and location data that identifies a location, among a plurality of locations, for each of the devices,
wherein the request further specifies at least one of said plurality of locations, and
wherein the data access part identifies said storage addresses of counter data entries for the or each specified device location.

3. The database management system according to claim 2, wherein said plurality of locations defines a logical hierarchy.

4. The database management system according to claim 1, wherein the database management system comprises a relational database management system in which the first data storage structure comprises a relational data storage structure.

5. The database management system according to claim 1, wherein the second data storage structure comprises an index object.

6. The database management system according to claim 1, wherein the second data storage structure comprises a view of the first data storage structure.

7. The database management system according to claim 1, wherein the second data storage structure comprises a materialized view of the first data storage structure.

8. The database management system according to claim 1, wherein the request comprises a structured query language, SQL, query.

9. The database management system according to claim 1, wherein the database management system is operable to receive counter data from the plurality of devices over a network via a network interface.

10. The database management system according to claim 9, further comprising means for polling the plurality of devices for the counter data.

11. The database management system according to claim 1, wherein the plurality of devices comprises multi-function printing devices.

12. A non-transient computer-readable storage medium carrying computer readable code for configuring a computer as the database management system according to claim 1.

13. A method of accessing data in a database management system, the method comprising:
in a first data storage structure, storing timestamped counter data entries for each of a plurality of devices in an unordered manner and such that each counter data entry is assigned a uniquely identifiable storage address;
in a second data storage structure, storing and mapping between:
address data that identifies the storage addresses of counter data entries, excluding those counter data entries which are null or empty,
timestamps corresponding to said counter data entries, and
device identifiers that identify the devices to which said counter data entries correspond; and
in response to receiving a request for data that specifies a time period and at least one of said plurality of devices, using the second data storage structure to identify, for the or each specified device, the storage addresses of the temporally first and last counter data entries that fall within the specified time period and that are not null or empty.

14. The method of accessing data in a database management system according to claim 13, further comprising polling the plurality of devices for counter data.

15. A non-transient computer-readable storage medium carrying computer readable code for controlling a computer to carry out the method of claim 13.

* * * * *